H. M. PILKINGTON.
COUNTING HEAD.
APPLICATION FILED JULY 28, 1911.

1,103,428.

Patented July 14, 1914.
6 SHEETS—SHEET 1.

Fig. 1.

WITNESSES:
Samuel M. Ward Jr.
Timothy E. Raftery

INVENTOR
Herbert M. Pilkington
BY
Kenyon & Kenyon
ATTORNEYS

H. M. PILKINGTON.
COUNTING HEAD.
APPLICATION FILED JULY 28, 1911.

1,103,428.

Patented July 14, 1914.
2 SHEETS—SHEET 2.

WITNESSES:
Samuel H. Ward Jr.
Timothy E. Raftery

INVENTOR
Herbert M. Pilkington
BY Kenyon & Kenyon
ATTORNEYS

H. M. PILKINGTON.
COUNTING HEAD.
APPLICATION FILED JULY 28, 1911.

1,103,428.

Patented July 14, 1914.
6 SHEETS—SHEET 3.

WITNESSES:
Samuel M. Ward Jr.
Timothy E. Raftery

INVENTOR
Herbert M. Pilkington
BY
Kenyon & Kenyon
ATTORNEYS

H. M. PILKINGTON.
COUNTING HEAD.
APPLICATION FILED JULY 28, 1911.

1,103,428.

Patented July 14, 1914.
6 SHEETS—SHEET 4.

WITNESSES:
Samuel H. Coard Jr.
Timothy E. Raftery

INVENTOR
Herbert M. Pilkington
BY Kenyon & Kenyon
ATTORNEYS

UNITED STATES PATENT OFFICE.

HERBERT M. PILKINGTON, OF ARVERNE, NEW YORK, ASSIGNOR, BY MESNE ASSIGNMENTS, TO TITLE GUARANTEE & TRUST COMPANY, TRUSTEE, OF NEW YORK, N. Y.

COUNTING-HEAD.

1,103,428. Specification of Letters Patent. Patented July 14, 1914.

Application filed July 28, 1911. Serial No. 641,052.

*To all whom it may concern:*

Be it known that I, HERBERT M. PILKINGTON, a citizen of the United States, and a resident of Arverne, Long Island, county of Queens, and State of New York, have invented a certain new and useful Improvement in Counting-Heads, of which the following is a specification.

My invention relates to counting heads and more particularly to counting heads for counting revolutions of an operating shaft and for arresting the shaft from further movement after it has been rotated a given number of revolutions.

My invention is adapted to be used with a great variety of machines in which some operating part is to be arrested from further movement after it has been rotated through a predetermined number of revolutions, or moved through a predetermined number of cycles of operation as the case may be, but in the form herein illustrated the invention is especially useful for and is intended to be used in connection with what is known as a step and repeat machine such as shown and described in my co-pending application Serial No. 633,196, filed June 14, 1911 in which machine a sensitized plate is provided which must be moved with great accuracy step by step in front of a projecting lens so as to properly position successive objects or designs to be photographed upon said plate.

One of the objects of my invention is to provide an efficient and durable counting head by means of which after an operating shaft has been rotated a given number of revolutions it will be positively arrested from further operation, and the counting mechanism reset to again arrest the shaft after it has been moved through the same number of revolutions, and so on.

Another object of the invention is to provide a counting head by means of which a predetermined number of complete revolutions and fractions of a revolution of the shaft may be permitted and then the shaft positively arrested from further operation, and in which the parts may be readily reset for a duplicate counting operation.

Still another object of invention is to provide a counting head in which there is a device for counting complete revolutions, and another for measuring fractions of a revolution, both of which may be automatically reset by suitable mechanism controlled through an operating handle.

Other objects of my invention will be best understood from the following description taken in connection with the accompanying drawings in which—

Referring to the drawings (Figs. 1, 2 and 3), 1 is a shaft which is to be positively arrested at the expiration of a desired number of complete revolutions and a desired fraction of a revolution. The shaft extends through a back plate or support 2 bolted to any suitable part of the machine, and to this back plate is bolted or otherwise firmly secured an annular shell or ring 3 having a front cover or face plate 4 rigidly secured thereto by screws 5, the face plate having gear teeth 6 cut thereon or a suitable gear wheel secured thereto as desired, while the annular shell or ring 3 is provided with inner gear teeth 7 which may be formed at a thickened portion of the ring as shown, or may be made in a separate inner gear and secured to the ring as desired.

Figure 1:
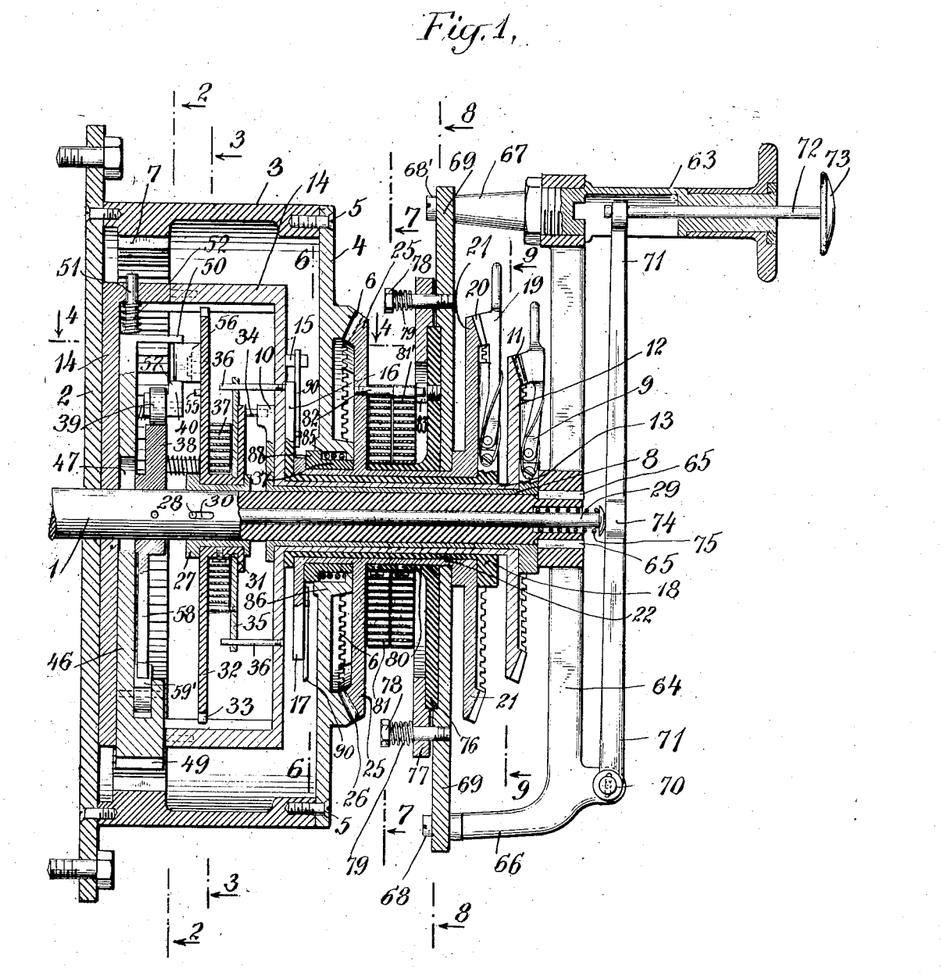
Figure 1 is a longitudinal sectional elevation showing the preferred embodiment of my invention as adapted to an operating shaft.

On the shaft 1 is mounted a sleeve 8 having a spring pressed pointer 9 secured thereto at its outer end and a stop 10 secured thereto at its inner end, the pointer 9 being suitably formed to engage with teeth 11 formed on a graduated dial 12, the pointer and dial serving to indicate the desired number of complete revolutions through which shaft 1 is to be turned. The dial 12 is mounted on a sleeve 13 which revolves loosely upon sleeve 8 and at its inner end is connected to an open supporting frame 14 which will be referred to as a device for measuring fractions of a revolution. This supporting frame is provided with a lug 15 which is adapted to engage with either of two fingers or stops 16 and 17. Finger 16 is secured to the inner end of a sleeve 18, the outer end of which is provided with a spring-pressed pointer 19 which is adapted to engage with teeth 20 formed on a graduated dial 21 which in turn is secured to the outer end of a sleeve 22 loosely mounted on sleeve 18 and to the inner end of which is secured the stop 17. The sleeve 22 is normally held locked to the shell 3 by means of a double sector 25 having teeth 26 formed thereon to engage with the teeth 6 formed on the face plate 4.

A short sleeve 27 is mounted on the shaft within the open frame 14 and is connected by a pin 28 to a rod 29 extending longitudinally through the center of the shaft, the pin 28 passing through a slot 30 in the shaft so that the rod 29 may move in and out to shift the sleeve 27 back and forth on the shaft as hereinafter described. Rotatively mounted on this sleeve 27 there is a hub 31 having a disk 32 with suitable teeth 33 cut on the periphery thereof, which disk will be referred to as a device for counting complete revolutions of the shaft since it is intended to be moved a given distance for each revolution of the shaft. At the other end of the hub there is provided a projecting arm having a pin or lateral projection 34 adapted to engage with the stop 10 which projects in its path of movement. Loosely mounted on the hub 31 there is a disk 35 which is secured from rotative movement with respect to the frame 14 by means of two or more pins 36 which project laterally from frame 14 and extend loosely through suitable holes in the disk. This disk is connected with disk 32 by means of a spring 37 having its ends respectively secured to the disks. This spring (in the present form of my invention) is wound so that its tendency is to rotate disk 32 in an anti-clockwise direction to hold pin 34 against stop 10 which determines the position of the disk 32. The tension in the spring is sufficient to force the pin against the stop 10 for any setting of pointer 9 or dial 12.

Figure 5:
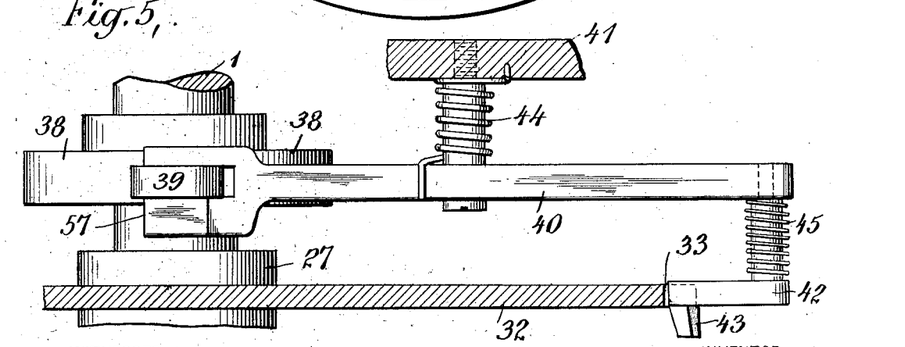
Fig. 5 is an enlarged view of the mechanism for operating the device for counting complete revolutions.

The disk 32 is operated from the shaft 1 by a cam or eccentric 38 keyed to the shaft at the rear of the sleeve 27. This cam engages a roller 39 mounted at one end of a lever 40 pivoted upon an extension 41 of the frame or fraction-measuring device 14. This lever at its other end is provided with a ratchet pawl 42 having a tooth 43 engaging the teeth 33 of disk 32 so as to move the disk one step in a clockwise direction for each revolution of the shaft and eccentric. The lever 40 is acted upon by a spring 44 which is fastened at one end to the lateral projection 41 of the frame 14, and at its other end bears against the ratchet pawl lever 40, so as to hold it down in position against cam 38. Likewise, the pawl 42 is provided with a spring 45 which holds its tooth in engagement with the teeth 33 of the disk 32. The disk 32 is held in its operated position against spring 37 by a ratchet dog 42′ having a tooth 43′ engaging the teeth 33 of the disk. The front edges of the teeth 43 and 43′ taper outward from their working edges, as shown in Fig. 5, so that they will readily slip into and out of engagement with the teeth 33 and clear these teeth when disk 32 is moved outward on the shaft and restored through spring 37 to its former position against its stop 10.

Mounted on shaft 1 at the rear of cam 38 there is a reciprocating member preferably in the form of a bolt 46 having a longitudinal slot 47 through which the shaft passes, the slot being of such dimensions as to permit the bolt to reciprocate laterally with respect to the shaft. The lower end of the bolt extends through a slot 48 in one end of the open frame 14, and the bolt is provided at this end with one or more teeth 49 which normally engage with the inner teeth 7 of shell 3 to lock the frame 14 to the shell. The upper end of the bolt is provided with a lateral projection 50 and with a vertical extension 51 preferably in the form of a pin which slides loosely through an opening in the other end of frame 14. A spiral spring 52 surrounds this bolt and is confined between the adjacent end piece of frame 14 and the lateral projection 50 of the bolt, and normally holds the bolt in locking engagement with the teeth 7.

After the shaft has been rotated the desired number of revolutions, it is necessary to permit the shaft to be moved through the remaining predetermined fraction of a revolution, and to then lock it from further movement in that direction. In the present form of my invention, I accomplish this by providing suitable means brought into operative relation with the operating mechanism of disk 32 at the completion of the predetermined number of revolutions of the shaft, whereby said operating mechanism of disk 32 is rendered effective to lift the bolt 46 and release frame 14, at which time the frame is locked to the shaft, so that the shaft can only be moved through the predetermined fraction of a revolution necessary to bring lug 15 into engagement with one or the other of the stops or fingers 16 and 17, according to the direction of rotation of the shaft. In the form of my invention illustrated, I accomplish this result by providing an arm 53 pivoted to disk 32 and normally held by a spring 54 against a stop 55 on the disk. This arm is provided with a head 56 which is brought in position under the lateral projection 50 of bolt 46 just prior to the completion of the last complete revolution of the shaft, so that as the shaft completes its last revolution, the extreme outer surface of the cam or eccentric 38 will force a seat 57 on the end of lever 40 up against the head 56 of the lever, thus throwing the lever upward against its spring 54, compressing spring 52 on the bolt and unlocking the bolt from engagement with teeth 7. It will be seen that this head 56 will be brought into position under the lateral projection 50 of the bolt at the completion of the last of any indicated number of revolutions, for, assuming that the dial 12 has a hundred teeth, and that it is desired to rotate the shaft say thirty revolutions, then the pointer 9 is moved in an anti-clockwise direction thirty teeth from the zero or normal setting, thus moving stop 10 30/100 of an arc in an anti-clockwise direction, whereupon spring 37 rotates disk 32 and with it arm 53 in an anti-clockwise direction until lateral pin 34 comes into engagement with the stop 10. At this position of the disk 32 it will take thirty revolutions of the shaft to move the disk 32 back into position to bring head 56 under the edge of the lateral projection 50. Immediately upon the lifting of bolt 46 as described, a finger 58 projecting from the cam member is gripped on either side by two spring-pressed dogs 59, 59', which are pivoted to the bolt and provided with slots 60, 60' through which pins 61, 61' extend and against which the dogs are outwardly pressed by springs 62, 62'. By means of this finger and the dogs, the bolt and the frame 14 to which it is slidingly connected, are immediately locked to the cam and shaft as soon as the bolt is withdrawn to release said frame or fraction-measuring device from the teeth 7 of outer shell 3. The shaft now being locked to the released frame 14, it may be rotated through the indicated fraction of a revolution, at the end of which movement lug 15 on frame 14 will engage one or the other of fingers or stops 16 or 17, according to the direction of rotation of the shaft, and arrest the shaft from further movement in that direction. It will be observed that these two fingers are locked in position with respect to each other by means of the pointer 19 which is in engagement with the teeth 20 of fractional indicating dial 21; and that the sleeve on which this dial is mounted is, in turn, locked to the outer shell 3 by means of the teeth 26 on double sector 25 which are in engagement with the teeth 6 on the face plate 4 of said shell.

In using apparatus of this kind for operating step and repeat machines above referred to and for other purposes, it is desirable that as much of the mechanism as possible should be controlled from the operating handle, and that the complete revolution-counting device and the fraction-measuring device should be automatically reset at the completion of the predetermined cycle of movements of the shaft. To accomplish these purposes, I have constructed the operating handle as follows: The main grip 63 of the handle is secured to a bar 64 which is keyed to the outer end of shaft 1 by keys 65, so that the shaft is rotated when the handle is turned, but may be moved in and out thereon. This bar is provided at each end with legs 66, 67, which are secured by screws 68, 68' to a disk 69 loosely mounted on sleeve 22. This bar is provided with a lug 70 to which is pivoted a lever 71 provided at its other extremity with a push rod 72 extending through an opening in the handle grip 63, and having on its outer end a button 73. The lever intermediate its ends and opposite the shaft, is provided with a seat 74 against which the head of the central rod 29 is thrust by a helical spring 75 which surrounds the head of the rod and is seated in a recess in the end of the shaft 1. The lever 71 and rod 29 are shown in the position they assume when the operator has his hand upon the handle and is in the act of turning the shaft to count the revolutions thereof. In this position the rod 29 is forced in against spring 75 so as to hold the short sleeve 27 and disk 32 in their inner position to keep teeth 33 of the disk in engagement with the ratchet teeth 43, 43'; for, as soon as the operator removes his hand from the button 73, spring 75 will force rod 29 outward and, through pin 28 and sleeve 27, the disk 32 will be thrown outward on the shaft to disengage its teeth from the ratchet teeth whereupon spring 37 will return the disk to its former position against its stop 10. In order to automatically advance the stops 16 and 17 of the fraction-measuring device after each count, they are connected by means of a suitable friction clutch and spring mechanism, to the disk 69, and in the present embodiment of my invention, this apparatus consists of a friction disk 76 which is normally held in frictional engagement with the inner side of disk 69 by means of an annular ring 77 held in position on disk 69 by means of bolts 78, and held into frictional engagement with disk 76 by means of springs 79 surrounding said bolts. The friction disk is provided with a sleeve or hub 80 which is loosely mounted on sleeve 22, and to this hub are secured two oppositely wound spiral springs 81, 81' which have their outer ends secured to a pin 82 projecting from the double sector 25, and extending in the path of a suitable lug or stop 83 on the friction disk 76. By this arrangement, when the operator turns handle 63 to rotate the shaft, one or the other of the springs 81, 81', depending upon the direction of rotation, will be put under tension during the first revolution of the handle, at the completion of which the stop 83 will strike the outer end of pin 82 and prevent further winding of the spring. This is for the purpose of winding up the spring 81 or 81', depending upon the direction of rotation of the handle so that the spring will be under tension to automatically advance the stops 16 and 17 when the sector 25 is released at the completion of the first desired cycle of operations of the shaft so as to put the stops in position to permit the shaft to again be moved through the same exact fraction of a revolution at the completion, for the second time, of the indicated number of complete revolutions. Two springs are used wound in opposite directions because the stops 16 and 17 which are locked together in their spaced condition, must be advanced in one or the other direction, depending upon the desired direction of rotation of the shaft, and there must be a spring for advancing the stops in either direction desired. The slipping engagement of disk 76 between ring 77 and disk 69 will permit the continued rotation of the handle through the desired number of revolutions indicated on the dial.

After the handle has been rotated through the indicated number of complete revolutions and the indicated fraction of a revolution, projection 15 on the fraction-measuring frame 14 will have been moved into engagement with stop 17, at which position the shaft will be positively arrested from further movement. If it is now desired to move the shaft through a similar cycle of operations, the operator first releases the pressure of his hand on button 73 and, as above explained, disk 32 will be disengaged from its ratchet pawls and returned to its former position against stop 10, whereupon the operator grips the handle, forcing button 73 and handle grip 63 toward each other, as a result of which, lever 71 is forced toward the handle bar 64 until rod 29 is removed down upon its seat at the lower end of slot 30 in the shaft, so that the outer end of rod 29 becomes a fulcrum point for lever 71, and further exertion tending to bring the handle grip and button 73 together will pull handle bar 64 and disk 69 forward. The forward movement of the disk 69 will cause disk 76, sleeve 22 carrying the double sector 25 and the dial 21, and the sleeve 18 to slide forward on sleeve 13 against the force of a spring 85 which is located in a recess between a front flange on hub 86 of the face plate 4 and a rear flange of a short sleeve 87 mounted on sleeve 22 within the hub and held in position by the double sector 25 and a rear flange 88 of sleeve 87. The outward movement of the double sector 25 disengages its teeth 26 from the teeth of the face plate, whereupon the spring 81 now under tension will rotate sleeves 22 and 18, which are locked together through the dial and pointer, in a clockwise direction until finger 16 is again brought into engagement with the projecting lug 15 of the fraction-measuring device 14 which was locked to shell 3 when the disk 32 was disengaged from its ratchet mechanism. If the operator now releases his grip on the handle, spring 85 throws the sleeves 22 and 18 inward, again bringing the teeth of double sector 25 into engagement with the teeth of the face plate 4 to lock the stops 16 and 17 in position. Since the fingers 16 and 17 are spaced apart the indicated fraction of a revolution, the finger 17 will now be that fraction of a revolution in advance of projection 15, so that the parts are now set for a second duplicate operation of the shaft.

Figures 6, 7, 11:
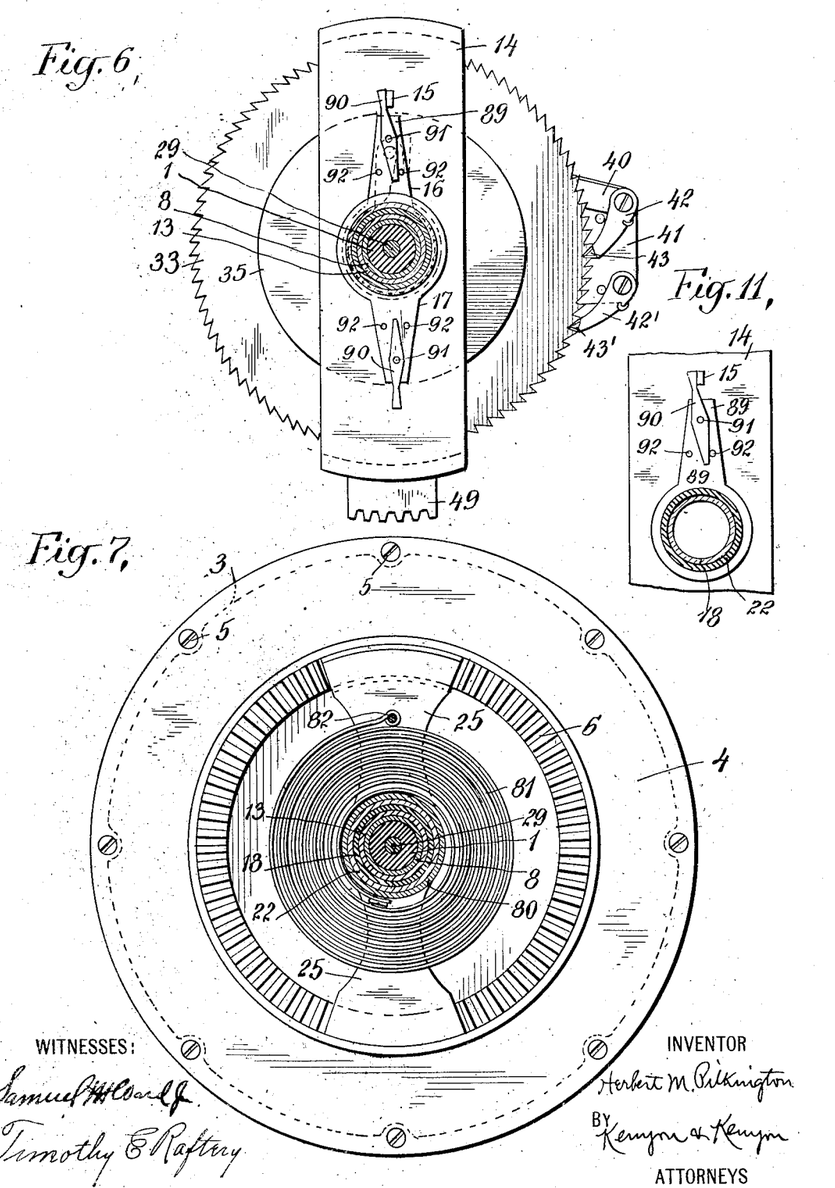
Fig. 6 is a cross-sectional view taken on line 6—6 of Fig. 1, showing the stops for arresting the movement of the shaft at the completion of the predetermined number of revolutions and fraction of a revolution.
Fig. 7 is a cross-sectional view taken on line 7—7 of Fig. 1.
Fig. 11 shows a detail.
Figure 8:
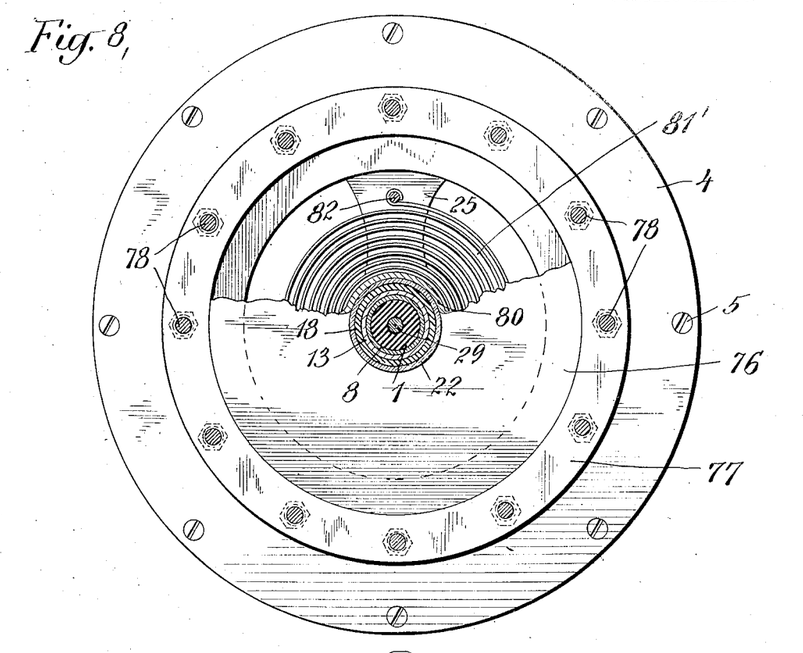
Fig. 8 is a cross-sectional view taken on line 8—8 of Fig. 1, with certain parts broken away.
Figure 9:
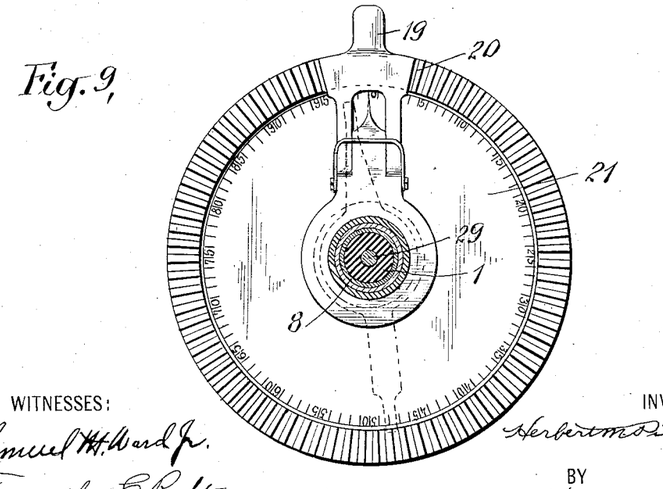
Fig. 9 is a sectional view taken on line 9—9 of Fig. 1, showing the dial and pointer for indicating desired fractions of a revolution of the shaft.
Figure 10:
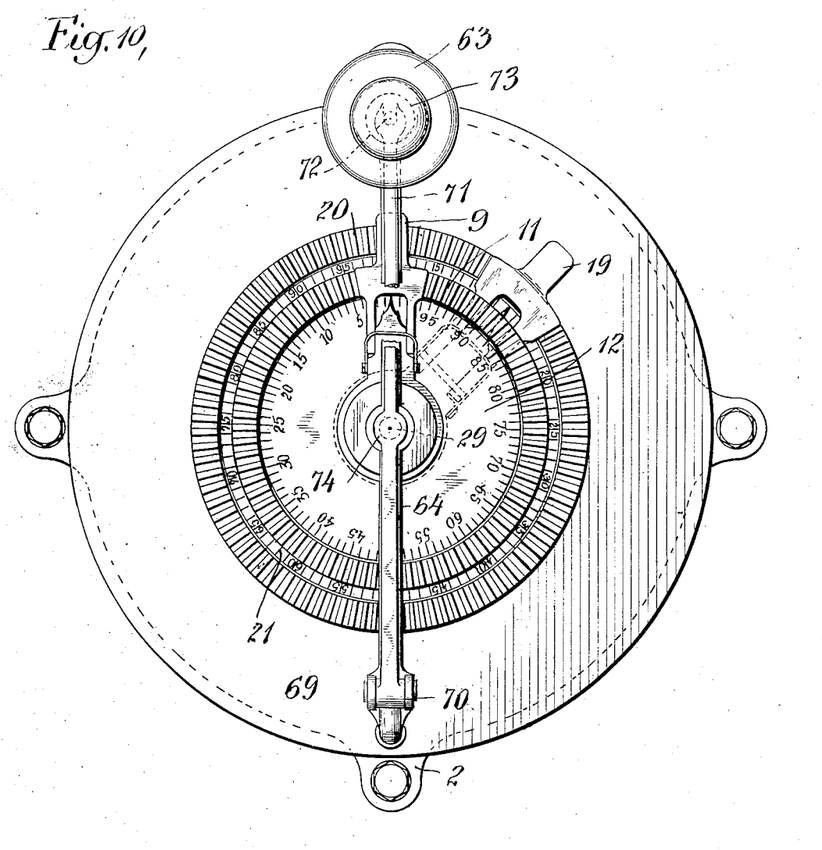
Fig. 10 is a front elevation of the apparatus of Fig. 1, showing the operating handle and the dials and pointers for indicating complete revolutions and fractions of a revolution.

If the fingers 16 and 17 were not specially constructed, it would be impossible to accurately determine the fractions of a revolution, since the thickness of the stops and the lug 15 take up a certain distance along the path of rotation. To obviate this difficulty and to permit the measuring of any fraction of a complete revolution, I construct these fingers as shown in Figs. 6 and 11. There it will be seen that each of the fingers consists of a main finger portion 89, near the outer end of which is pivoted a finger tip 90 which is free to move on its pivot 91 between pin stops 92 on each side thereof, the movement of the finger tip being just sufficient to permit the center line of the projection 15 to coincide with the center line of the finger when said projection rests against the pivoted finger tip. By this construction it is possible to accurately measure any fraction of a revolution in either direction of rotation, no matter how near zero or the complete revolution mark. The two stops 16 and 17 are constructed alike except that, as shown in Fig. 1, they are in different planes of rotation, so that when no fraction of a revolution is desired, the stops will rest one exactly over the other with the projection 15 projecting between the pivoted finger tips 90, each of which is tilted aside on its pivot so that the projection 15 rests on the center line of the overlapping stops.

When the movement of the shaft includes a fraction of a revolution, the fingers 16 and 17 act as stops to prevent further rotation of disk 32 relative to the shaft after the shaft has been moved the desired number of complete revolutions, since at this time the disk, through ratchet mechanism 42—40, frame 14, bolt 46, dogs 59, 59' and finger 58, is positively connected to the shaft. On the other hand, when the movement of the shaft does not include a fraction of a revolution, the fingers 16 and 17 act, upon the completion of the indicated number of complete revolutions, as stops to prevent further rotation of the shaft and connecting devices, since the stops at the zero setting would overlap each other with lug 15 of frame 14 held firmly between their pivoted tips, thus preventing any movement of frame 14 to which the shaft and counting disk are positively locked when the bolt 46 is thrown.

An important feature of my invention is that of providing such apparatus for operating the disk 32 as will rotate the disk a given distance for a given number of rotations of the shaft in either direction, but will not permit the movement of the disk through this given distance except by a complete rotation of the shaft. In the particular form of apparatus shown, in which the disk is moved one tooth for each revolution of the shaft, and in which I have utilized a cam and ratchet mechanism for accomplishing this result, the eccentric must move the ratchet lever up and down to advance the disk one tooth, and anything less than a complete rotation of the shaft in either direction will fail to move the pawl tooth into engagement with the next preceding tooth of the disk, so that the shaft must always be moved a complete revolution to move the disk one tooth; and this is true even when the rotations are successive ones in opposite directions. In the usual form of snail gearing for driving a wheel one step for each revolution of another wheel which has but one tooth, if the single toothed wheel be moved one revolution so that its tooth engages one of the teeth of the larger wheel and has moved it one step, then the single tooth will be in a position just beyond the teeth of the large wheel, and if now the shaft carrying the single toothed wheel is rotated in the opposite direction, the single tooth will again engage the teeth of the large wheel and move it a step in the opposite direction, although the shaft has passed but through a very small fraction of a revolution. By the above described apparatus for operating the disk 32, this difficulty is obviated.

In the present form of my invention, dials 12 and 21, the face plate 4, the disk 32 and the shell 3 are each formed with a hundred teeth so that if it is desired to turn the shaft ten revolutions and 20/100 of a revolution, the finger 9 of the complete revolution index dial is moved in an anti-clockwise direction ten teeth away from the zero position; and the finger 19 and the fraction-indicating dial 21 are separated twenty teeth, in the case of clockwise rotation of the shaft, by rotating the dial in a clockwise direction, and in the case of anti-clockwise rotation of the shaft, by rotating the pointer in an anti-clockwise direction.

Figure 2:
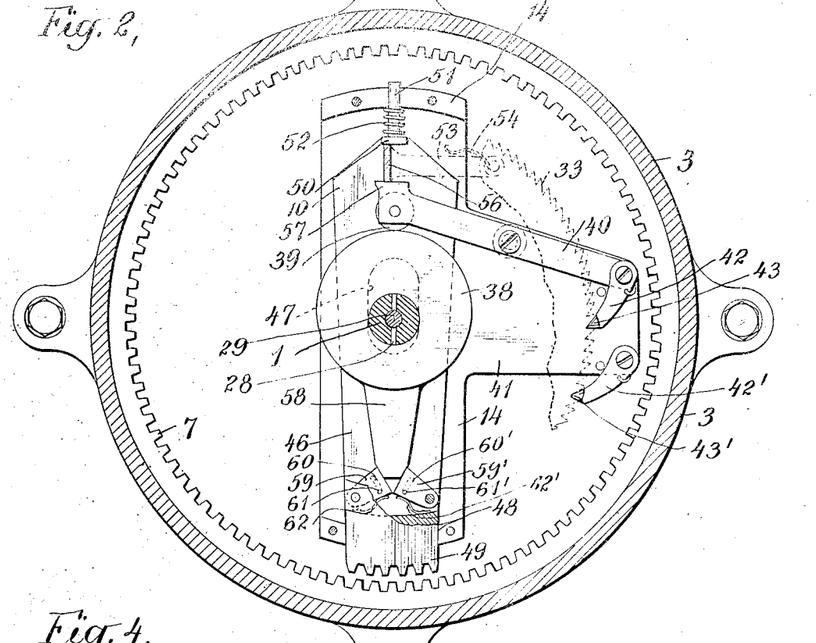
Fig. 2 is a cross-sectional view taken on the line 2—2 of Fig. 1 and showing the preferred mechanism for operating the complete revolution counter.
Figure 3:
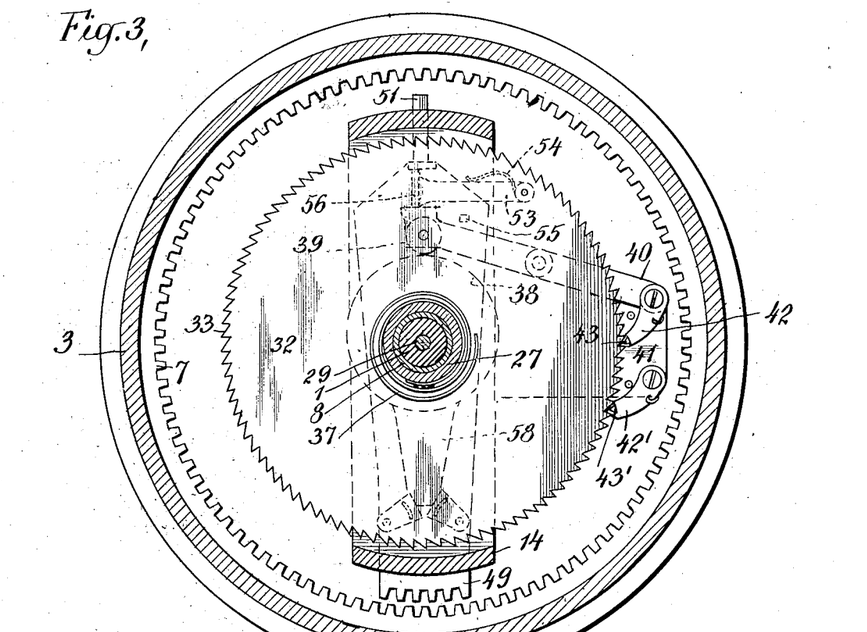
Fig. 3 is a cross-sectional view taken on the line 3—3 of Fig. 1, showing the preferred form of the device for counting complete revolutions and a part of the mechanism for operating the same.
Figure 4:
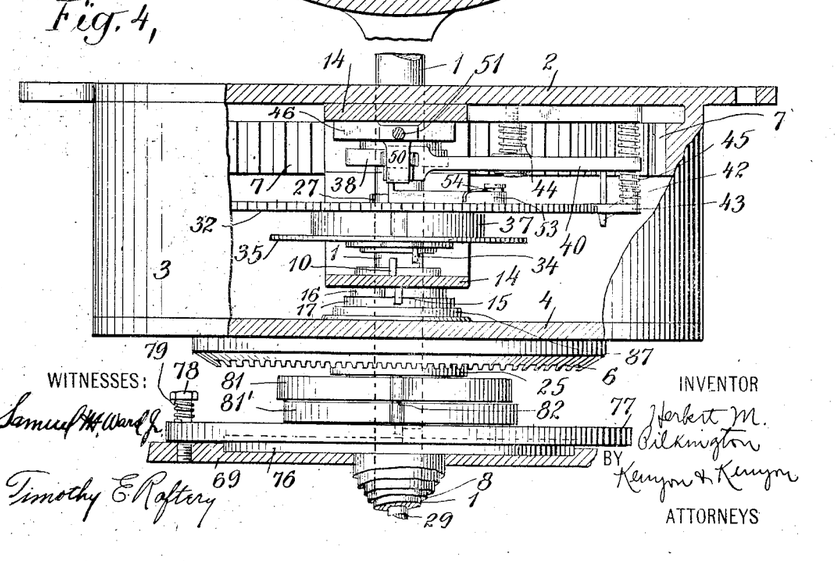
Fig. 4 is a top plan view of the apparatus shown in Fig. 1, with certain parts broken away and others in section to show different parts of the mechanism.

Operation: In order to bring out clearly the practical advantages of my counting head, we will assume that it is to be used in a step and repeat machine such as is shown in my above-mentioned co-pending application, in which machine the end of shaft 1 is provided with threads which engage a threaded nut secured to a sliding carriage adapted to support a sensitized plate which is to be moved by successive steps of say two and two one-hundredth inches each past a projecting lens, the threads on the shaft and nut being ten to the inch, and each of the gears of the counting head having one hundred teeth as above explained. If it is desired to set the counting head so as to permit the carriage to be moved by successive steps of two and two one-hundredths of an inch the pointer 9 is moved in an anti-clockwise direction twenty divisions or teeth from the zero point, and the dial 21 is moved twenty points in a clockwise direction from pointer 19 so as to separate stops 16 and 17 twenty one-hundredths of a revolution. If now the operator grasps handle 63 and presses button 73 sufficiently to force rod 29 down upon its seat at the bottom of slot 30, the counting disk 32, through pin 28 and sleeve 27, is thrust inward on the shaft so as to bring the ratchet teeth 43 and 43' into mesh with the teeth 33 of the disk. At this stage of the operation pin 34 is held against stop 10 by the spring 37, and this stop is rigidly locked with the measuring frame 14 through the dial 11 and pointer 9, the measuring frame in turn being locked to the inner ring 3 by bolt 46, and the stops 16 and 17 are locked from movement by the teeth of the double sector 25 engaging with the teeth of the face plate 4. If the operator now turns the handle in a clockwise direction, each rotation of cam 38 will raise and lower the ratchet lever 40 so as to advance disk 32 one tooth for each revolution of the shaft, the disk being retained in its advance position by the ratchet dog 42' (Fig. 2). The disk 32 continues to advance toward its normal position with respect to frame 14 for each revolution of the cam until at the completion of the last indicated revolution, in this case the twentieth revolution, the disk will have moved into position to bring head 56 under the lateral projection 50 of bolt 10, at which time the outer surface of the cam 38 will come into position to bear on roller 39 of ratchet lever 40, and thus force seat 57 against the head 56 of lever 53, forcing it against the lateral projection 50 until when the extreme outer edge of the cam has reached the position shown in Fig. 2, the bolt 46 has been withdrawn from engagement with teeth 7 of ring 3, immediately upon the happening of which the pivoted dog 59' clicks into position behind finger 58, thus locking the finger between the dogs 59 and 59'. This finger being integral with the cam which is keyed to the shaft, the shaft is now rigidly locked through this finger and these dogs to the bolt, which in turn is rigidly connected to the measuring frame 14 as regards rotative movement, and since this frame is connected through the ratchet pawls to the disk 32, all of these parts are rigidly locked together from relative rotation, but the bolt 46 being withdrawn from the teeth 7, the shaft with all of these parts is free to continue its rotation until projection 15 on the measuring frame 14 engages stop 17, at the completion of which movement the shaft will have been rotated through the number of indicated revolutions and the indicated fraction of a revolution. If the operator now releases the weight of his hand from button 73, spring 75 will throw rod 29 forward which, through pin 28 and sleeve 27, will move disk 32 out of engagement with its ratchet teeth whereupon spring 37 will rotate the disk 32 in an anti-clockwise direction until the stop pin 34 comes into engagement with stop 10, the setting of which is unchanged with respect to the measuring frame 14 and dial 12, although this measuring frame and the dial as a whole have been moved to a different position with respect to the main frame 3. Immediately upon disk 32 being thrown forward out of engagement with the ratchet teeth so as to withdraw head 56 from under lateral projection 50 of bolt 46, the spring 52 thrusts the bolt forward into engagement with the teeth 7 of ring 3 so that the measuring frame 14 is positively locked from rotation, and the dogs 59, 59, moving down with the bolt, leave the shaft and cam 38 free to rotate. The operator after releasing disk 32 and locking the frame 14 in this manner, now presses button 73 and handle grip 63 together in the manner heretofore described so as to draw disk 69, and with it sleeves 22 and 18, forward against the thrust of spring 85 so as to disengage the double sector from the teeth on face plate 4, whereupon the spring 81, acting through double sector 25 and sleeves 22 and 18 which are locked together by the dial and pointer, rotates fingers or stops 16 and 17 in a clockwise direction until the rear stop 16 is brought up against the projection 15 of the measuring frame 14, at which time the finger 17 will be the indicated fraction of a revolution in advance of said projection so as to permit the measuring frame to be again moved through said fraction. If the operator now releases his grip, spring 85 will force the teeth of the double sector into engagement with the teeth of the face plate 4, thus locking the stops 16 and 17 in their newly set position, and the parts are now set and ready for a second duplicate operation of the shaft at the expiration of which the shaft will be positively arrested as it formerly was, and the parts may again be set in the manner described, and so on for any desired number of steps of the carriage. If the carriage has been moved to one of its extreme positions, and it is desired to return it by similar steps, the operator will not release the double sector 25 to advance the stops 16 and 17, since the projection 15 will be against the finger 17 and at the completion of the desired number of anti-clockwise rotations of the shaft the measuring frame 14 will be rotated in an anti-clockwise direction until the projection 15 comes into engagement with stop 16, whereupon it will be arrested from further movement and will have moved through the indicated fraction of a revolution.

While I have shown and described my apparatus in what I believe to be the best form now known to me, and have explained its operation in connection with a step and repeat machine, I do not wish to be understood as limiting the invention to any particular construction and arrangement of parts other than as indicated in the appended claims, nor do I wish it to be limited to its use with any particular kind of machine or apparatus, since it is obvious that in some of its broader features the invention is useful in connection with any machine in which it is desired to permit a certain number of complete revolutions, or complete revolutions and a fraction of a revolution of the shaft, or, in some cases, a certain fraction of a revolution only, after which the shaft is arrested from further movement.

Having now fully described my invention, what I claim as new and desire to secure by Letters Patent, is:

1. In a counting head, the combination of a shaft the revolutions of which are to be counted, means for indicating the desired numbers of revolutions of the shaft, a counting device for counting revolutions of the shaft normally disconnected from the shaft, means for moving said device a given distance for each revolution of the shaft, means connecting the counting device and the shaft at the completion of a predetermined number of revolutions of the shaft, means movable into position at the completion of a predetermined number of revolutions of the shaft to effect said connection, and means for disconnecting the counting device from the shaft.

2. In a counting head, the combination of a shaft the revolutions of which are to be counted, means for indicating the desired numbers of revolutions of the shaft, a counting device for counting revolutions of the shaft normally disconnected from the shaft, means for moving said device a given distance for each revolution of the shaft, means connecting the counting device and the shaft at the completion of a predetermined number of revolutions of the shaft, means movable into position at the completion of a predetermined number of revolutions of the shaft to effect said connection, means for disconnecting the counting device from the shaft, and means for restoring the counting device to its normal position.

3. In a counting head, the combination of a shaft the revolutions of which are to be counted, means for indicating desired numbers of revolutions of the shaft, an adjustable stop movable to different positions corresponding to the desired number of revolutions, means for holding the stop at said position, a rotatable member movable with respect to the stop, means operated by the shaft for moving said rotating member equal distances for equal numbers of revolutions of the shaft, and means for resetting the rotatable member to its normal position with respect to the stop.

4. In a counting head, the combination of a shaft the revolutions of which are to be counted, means for indicating desired numbers of revolutions of the shaft, an adjustable stop movable to different positions corresponding to the desired number of revolutions, a rotatable member movable with respect to the stop, means acting to move said rotatable member into engagement with the stop, means operated by the shaft for moving said rotatable member away from the stop equal distances for equal numbers of revolutions of the shaft, and means for arresting the shaft at the completion of the desired number of revolutions.

5. In a counting head, the combination of a shaft the revolutions of which are to be counted, means for indicating desired numbers of revolutions of the shaft, an adjustable stop movable to different positions corresponding to the desired number of revolutions, means for holding the stop at its different positions, a movable member having a part operatively related to the stop to engage therewith, means operated from the shaft for moving said movable member distances proportional to the number of revolutions of the shaft, means for disengaging said movable member from its said operating means, and means for restoring said movable member when so disengaged, to its former position relative to the stop.

6. In a counting head, the combination of a shaft the revolutions of which are to be counted, a device rotatable with respect to the shaft for counting the revolutions of the shaft, means operated by the shaft for moving said device a definite distance for each revolution of the shaft, means for locking the counting device to the shaft at the completion of the desired number of revolutions of the shaft to rotate therewith, and an adjustable stop for arresting the movement of the shaft and counting device.

7. In a counting head, the combination of a shaft the revolutions of which are to be counted, means for indicating desired numbers of revolutions of the shaft, a device rotatable with respect to the shaft for counting the revolutions thereof, means operated by the shaft for moving said device, means for locking the counting device to the shaft at the completion of the desired number of revolutions thereof to rotate therewith, a stop for arresting the movement of the shaft and counting device, and means for automatically restoring the counting device to its normal position.

8. In a counting head, the combination of a shaft the revolutions of which are to be counted, a device rotatable with respect to the shaft for counting the revolutions of the shaft, means operated by the shaft for moving said device a definite distance for each revolution of the shaft, means for locking the counting device to the shaft at the completion of the desired number of revolutions of the shaft to rotate therewith, an adjustable stop for arresting the movement of the shaft and counting device, means for disconnecting said counting device from the shaft, and means for automatically restoring the counting device, when disconnected, to its normal position.

9. In a counting head, the combination of a shaft the revolutions of which are to be counted, means for indicating desired numbers of revolutions of the shaft, a device for counting the revolutions of the shaft, means for moving said device operated when the shaft is rotated, means for arresting the movement of the counting device at the completion of the desired number of revolutions of the shaft, means for restoring the counting device to its normal position, and means including a single operating handle for rotating the shaft and for rendering the restoring means effective to return said counting means to its normal position.

10. In a counting head, the combination of a shaft the revolutions of which are to be counted, a handle for operating the shaft, a device normally disconnected from the shaft for counting the revolutions of the shaft, means operatively connecting the counting device with the shaft to drive said device therefrom, means rigidly connecting the counting device and shaft at the completion of the desired number of revolutions of the shaft, means for arresting the movement of the counting device and shaft, and means controlled from the operating handle for disconnecting said counting device from the shaft.

11. In a counting head, the combination of a shaft the revolutions of which are to be counted, a handle for operating the shaft, means for indicating desired numbers of revolutions of the shaft, a device for counting the revolutions of the shaft, means operatively connecting the counting device with the shaft to drive the counting device therefrom, means for arresting the movement of the counting device at the completion of the desired number of revolutions thereof, means controlled from the operating handle for disengaging said counting device from its driving connections, and means for restoring the counting device to its normal position after it has been disengaged from its driving connections.

12. In a counting head, the combination of a shaft the revolutions of which are to be counted, a handle for operating the shaft, means for indicating desired numbers of revolutions of the shaft, an adjustable stop movable to different positions corresponding to the desired number of revolutions, means for holding the stop at its different positions, a movable member having a part operatively related to the stop to engage therewith, means operated from the shaft to move said member distances proportional to the number of revolutions of the shaft, means actuated from the operating handle for disengaging said movable member from its operating connections, and means for restoring said movable member to its former position relative to the stop after it has been disengaged from its operating connections.

13. In a counting head, the combination of a shaft the revolutions of which are to be counted, a device rotatable relative to the shaft and operatively related thereto, means operated by the shaft for moving said rotatable device a given distance for each revolution of the shaft and in a given direction for either direction of rotation of the shaft, and means for arresting the movement of the rotatable device after the shaft has been turned a predetermined number of revolutions.

14. In a counting head, the combination of a shaft the revolutions of which are to be counted, a rotatable device normally disconnected from the shaft and operatively related thereto, means operated by the shaft for moving said rotatable device a given distance for each revolution of the shaft and in a given direction for either direction of rotation of the shaft, means locking the rotatable device to the shaft after the shaft has been rotated a predetermined number of revolutions, means for arresting the movement of the shaft and said rotatable device, means for disconnecting said rotatable device from the shaft, and means for restoring the rotatable device to its normal position when disconnected.

15. In a counting head the combination of a shaft the revolutions of which are to be counted, a handle for rotating the shaft, a counting device rotatable with respect to the shaft and operatively connected thereto, means operated by the shaft for moving said counting device a given distance for each revolution of the shaft and in a given direction for either direction of rotation of the shaft, means for arresting the movement of the counting device after the shaft has been rotated a predetermined number of revolutions, means actuated from said handle for disengaging said rotative part from its driving means, and a spring for restoring the rotative part to its normal position.

16. In a counting head, the combination of a shaft the revolutions of which are to be counted, a rotatable device operatively connected to the shaft, means including a cam and ratchet mechanism for moving said rotatable device a given distance in one direction for each rotation of the shaft in either direction, means locking the shaft and cam to the rotatable device when the latter has been moved a predetermined distance, means for disengaging the rotatable device from the ratchet mechanism, and means for restoring said rotatable device to its former position with respect to its stop.

17. In a counting head the combination of a shaft the revolutions of which are to be counted, a device for counting complete revolutions of the shaft, a device for measuring fractions of a revolution of the shaft, means for driving the revolution counter by the shaft, means locking the fraction measuring device to the shaft after the shaft has been turned through the desired number of complete revolutions, and an adjustable stop for limiting the movement of the measuring device and shaft after they have been turned through the desired fraction of a revolution.

18. In a counting head, the combination of a shaft the revolutions of which are to be counted, a device rotatable with respect to the shaft for counting complete revolutions thereof, means for driving the revolution counter from the shaft, a device for measuring fractions of a revolution of the shaft, means for holding the fraction-measuring device normally stationary, means operatively related to the driving means of the counting device for releasing said fraction-measuring device, means locking the counting device and the measuring device to the shaft when the measuring device is released, and an adjustable stop for limiting the movement of the shaft and said devices after they have been moved through a predetermined fraction of a revolution.

19. In a counting head, the combination of a shaft the revolutions of which are to be counted, a device rotatable with respect to the shaft for counting complete revolutions thereof, means for driving the revolution counter from the shaft, a device for measuring fractions of a revolution of the shaft, means for holding the fraction-measuring device normally stationary, means operatively related to the driving means of the counting device for releasing said fraction-measuring device, means locking the counting device and the measuring device to the shaft when the measuring device is released, an adjustable stop for limiting the movement of the shaft and said devices after they have been moved through a predetermined fraction of a revolution, means for disconnecting the counting device from the shaft, and means for restoring it to its normal position when released.

20. In a counting head the combination of a shaft the revolutions of which are to be counted, a device operatively connected with the shaft for counting complete revolutions thereof, a device for measuring fractions of a revolution of the shaft, means for driving the revolution counter from the shaft, means operatively related to the driving means for locking the fraction measuring device to the shaft after the shaft has been turned the desired number of complete revolutions, an adjustable stop for arresting the movement of the counter, measuring device and shaft, and means for disconnecting the complete revolution counter from the shaft.

21. In a counting head the combination of a shaft the revolutions of which are to be counted, a handle for operating said shaft, a device operatively connected with the shaft for counting complete revolutions thereof, a device for measuring fractions of a revolution of the shaft, means for driving the revolution counter from the shaft, means locking the fraction measuring device to the shaft after the shaft has been turned the desired number of complete revolutions, an adjustable stop for arresting the movement of the counting and measuring devices and shaft, and means for disconnecting the revolution counting device and fraction measuring device from the shaft.

22. In a counting head the combination of a shaft the revolutions of which are to be counted, a handle for operating said shaft, a device operatively connected with the shaft for counting complete revolutions thereof, a device for measuring fractions of a revolution of the shaft, means for driving the revolution counter from the shaft, means operatively related to the driving means for locking the fraction measuring device to the shaft after the shaft has been turned the desired number of complete revolutions, an adjustable stop for arresting the movement of the counting and measuring devices and shaft, means for disconnecting the revolution counting device and fraction measuring device from the shaft, and a spring for restoring the counting device to its normal position.

23. In a counting head, the combination of a shaft the revolutions of which are to be counted, apparatus for indicating the desired number of complete revolutions of the shaft including a dial and a pointer as indicating members, means for holding the dial and pointer together at different relative positions, a normally stationary fraction-measuring device connected to one of the indicating members to move therewith, an adjustable stop connected with the other indicating member to move therewith, a rotatable counting device operatively connected with the shaft to be rotated a given distance for each revolution thereof, means tending to move said counting device into engagement with the stop, ratchet mechanism pivoted on the measuring device and operatively engaging the counting device to move said counting device away from the stop, a cam rotatably driven by the shaft and actuating the ratchet mechanism, means moved with the counting device and operatively related to the cam for releasing the normally stationary measuring device when the counting device has been moved a predetermined distance, means locking the shaft and cam to the measuring device when the latter is released, and an adjustable stop for arresting the movement of the shaft, cam and measuring device after they have been moved through a predetermined fraction of a revolution.

24. In a counting head, the combination of a shaft the revolutions of which are to be counted, a graduated dial and a pointer for indicating the desired number of revolutions of the shaft, means for holding the dial and pointer together at different relative positions, a normally stationary fraction measuring device connected to the dial and movable therewith, an adjustable stop connected with the pointer and movable therewith, a rotatable counting device operatively connected with the shaft to be rotated a given distance for each revolution thereof, ratchet mechanism pivoted on the measuring device and operatively engaging the counting device to move the same away from the stop, a cam keyed to the shaft and actuating the ratchet mechanism, means moved with the counting device and operatively related to the cam for releasing the normally stationary measuring device when the counting device has been moved a predetermined number of revolutions, means locking the shaft and cam to the measuring device when the latter is released, an adjustable stop for arresting the movement of the shaft, cam and measuring device after they have been moved through a predetermined fraction of a revolution, means for releasing the counting device from the ratchet mechanism, and means for moving said counting device against the first stop when so released.

25. In a counting head, the combination of a shaft the revolutions of which are to be counted, a dial and a pointer adapted to be locked at different positions relative to the dial for indicating fractions of a revolution of the shaft, a pair of stops operatively connected with the dial and pointer to be set apart at distances corresponding to the setting of the dial and pointer, a rotatable but normally stationary measuring device the rotation of which is limited by said stops, means normally locking said measuring device stationary, a device for counting complete revolutions of the shaft, means for moving said device a predetermined distance for each revolution of the shaft, means operatively related to the counting device for effecting the release of said measuring device when the counting device has been moved a predetermined distance, and means for locking said measuring device to the shaft when released.

26. In a counting head the combination of a shaft the revolutions of which are to be counted, a dial and a pointer adapted to be locked at different positions relative to the dial for indicating fractions of a revolution of the shaft, a pair of relatively movable stops operatively connected with the dial and pointer to be set apart at distances corresponding to the setting of the pointer and dial, a device rotatable with respect to the shaft for counting complete revolutions thereof, a rotatable but normally stationary device the movements of which are limited by said stops, ratchet mechanism pivotally mounted on said normally stationary device and operatively engaging the revolution counting device, a cam positively connected to the shaft for operating the ratchet mechanism, a bolt on the normally stationary device operated by the cam and normally locking said device from rotation, means brought into position when said revolution counter has been moved a predetermined distance for rendering the cam operative to move said bolt to release said normally stationary device, and means on said bolt for locking said last device to the cam when released.

27. In a counting head, the combination of a shaft the revolutions of which are to be counted, a device rotatably mounted on the shaft for counting complete revolutions thereof, a cam mounted on the shaft, means operated by the cam for rotating said counting device, a device for measuring fractions of a revolution of the shaft also rotatably mounted thereon, means normally locking said measuring device against rotation, means moved into operative relation with the cam at the expiration of a predetermined number of revolutions of the shaft to render the cam operative to move the locking device to unlock said measuring device, means connected to the normal locking device for locking said measuring device to the cam when released, mechanism for indicating fractions of a revolution of the shaft including a dial and a pointer operatively related to the dial, an adjustable stop connected with the indicating mechanism for limiting the movement of said measuring device and shaft when moved through the indicated fraction of a revolution, means for releasing the revolution counting device from its operating mechanism, and means for restoring said counting device to its normal position.

28. In a counting head, the combination of a shaft the revolutions of which are to be counted, a device rotatably mounted on the shaft for counting complete revolutions thereof, a cam mounted on the shaft, means operated by the cam for rotating said counting device, a device for measuring fractions of a revolution of the shaft also rotatively mounted thereon, means including a part mounted on the measuring device for normally locking said measuring device against rotation, means moved into operative relation with the cam at the expiration of a predetermined number of revolutions of the shaft to render the cam operative to move the locking device to unlock said measuring device, means for locking said measuring device to the cam and shaft when released, indicating mechanism including a dial and a pointer operatively related to the dial for indicating fractions of a revolution of the shaft, an adjustable stop connected with the indicating mechanism for limiting the movement of said measuring device and shaft when moved through the indicated fraction of a revolution, means including a handle lever and a rod for releasing the revolution counting device from its operative mechanism, and means for restoring said counting device to its normal position.

29. In a counting head, the combination of a shaft the revolutions of which are to be counted, a rotatable device for counting complete revolutions of the shaft, means operating said device from the shaft, a stop for determining the position of said counting device, a device for measuring fractions of a revolution of the shaft, means for connecting said last device with the shaft, a pair of sleeves rotatably mounted on the shaft, a graduated dial and an indicator operatively related thereto to indicate complete revolutions of the shaft, said sleeves at one end being connected one to the dial and one to the indicator and at their other end being connected one to the stop and the other to the device for measuring fractions of a revolution, a pair of relatively adjustable stops for arresting the movement of said shaft and measuring device when moved through the indicated fraction, a second graduated dial and an indicator operatively related thereto for indicating fractions of a revolution of the shaft, a second pair of sleeves rotatably mounted upon the outer one of the first pair, said outer pair of sleeves at one end being connected one to the fraction indicating dial and one to its indicator and at their other end being connected one to each of the stops for the fraction measuring device.

30. In a counting head, the combination of a shaft, the revolutions of which are to be counted, a handle for operating the shaft, a device rotatably mounted concentric with the shaft for counting complete revolutions thereof, means for operating said device from the shaft, a stop for determining the position of said counting device, a device for measuring fractions of a revolution of the shaft, means for locking said measuring device with the shaft at the expiration of a predetermined number of revolutions of the shaft, a pair of sleeves rotatably mounted on the shaft, a graduated dial and an indicator operatively related thereto to indicate complete revolutions of the shaft, the sleeves at one end being connected one to the dial and one to the indicator and at their other end being connected one to the stop and the other to the device for measuring fractions of a revolution, a graduated dial and an indicator operatively related thereto for indicating fractions of a revolution of the shaft, a pair of relatively adjustable stops for arresting the movement of said shaft and measuring device when moved through the indicated fraction, a second pair of sleeves rotatably mounted upon the outer of the first pair, said outer pair of sleeves at one end being connected one to the fraction indicating dial and one to the indicator and at their other end being connected one to each of the stops for the fraction measuring device, and means including a rod passing through the shaft and connected with the revolution counter and controlled from the handle for releasing said counter from its operating mechanism.

31. In a counting head, the combination of a shaft, the revolutions of which are to be counted, a handle for operating the shaft, a device rotatably mounted concentric with the shaft for counting complete revolutions thereof, means for operating said device from the shaft, a stop for determining the position of said counting device, a device for measuring fractions of a revolution of the shaft, means for locking said measuring and counting devices with the shaft at the expiration of a predetermined number of revolutions of the shaft, a pair of sleeves rotatably mounted on the shaft, a graduated dial and an indicator operatively related thereto to indicate complete revolutions of the shaft, the sleeves at one end being connected one to the dial and one to the indicator and at their other end being connected one to the stop and the other to the device for measuring fractions of a revolution, a graduated dial and an indicator operatively related thereto for indicating fractions of a revolution of the shaft, a pair of relatively adjustable stops for arresting the movement of said shaft and counting and measuring devices after they have been moved through the indicated fraction, a second pair of sleeves rotatably mounted upon the outer of the first pair, said outer pair of sleeves at one end being connected to the fraction indicating dial and the other to the indicator and at their other end being connected one to each of the stops for the fraction measuring device, means including a rod passing through the shaft and connected with the revolution counter for disengaging the same from its operating mechanism, means operated from the handle for operatively controlling said rod, and means for restoring the counting device to its normal position relative to its stop when the rod is operated to release it.

In testimony whereof, I have signed my name to this specification, in the presence of two subscribing witnesses.

HERBERT M. PILKINGTON.

Witnesses:
 SAMUEL M. WARD, Jr.,
 EDWIN SEGER.